DEVICE FOR MAKING PERFORATED RECORDS IN TRANSIT

Filed Nov. 12, 1952 3 Sheets-Sheet 1

INVENTORS
ROBERT E. PARIS
JOHN A. WIELAND
BY Murray Nanes
ATTORNEY

May 22, 1956 R. E. PARIS ET AL 2,746,548

DEVICE FOR MAKING PERFORATED RECORDS IN TRANSIT

Filed Nov. 12, 1952 3 Sheets-Sheet 2

INVENTORS
ROBERT E. PARIS
JOHN A. WIELAND

BY Murray Nanes
ATTORNEY

DEVICE FOR MAKING PERFORATED RECORDS IN TRANSIT

Filed Nov. 12, 1952 3 Sheets-Sheet 3

INVENTORS
ROBERT E. PARIS
JOHN A. WIELAND
BY Murray Nanes
ATTORNEY 2,746,548

DEVICE FOR MAKING PERFORATED RECORDS IN TRANSIT

Robert E. Paris, Poughkeepsie, and John A. Wieland, Fishkill, N. Y., assignors to International Business Machines Corporation, New York, N. Y., a corporation of New York Application November 12, 1952, Serial No. 319,998

2 Claims. (Cl. 164—115)

This invention relates to devices for making perforated records, and more particularly to devices for making such perforations while the records are in motion.

In the record controlled accounting machine art, the record used is the well-known type of card having columnar areas of twelve index point positions at which perforations may be made in various combinations to indicate data. With some applications of machine accounting, it has become advisable to record data into the card in the form of small pierced holes. For instance, it is sometimes desirable to put printed information upon the face of a card in which data has been recorded by perforations. If minute punctures are employed in the recording of such data, more space is allowed for the printing of information. By providing a device which is capable of making minute punctures in cards while the latter are in motion, it is possible to record data at higher speeds and at the same time provide a card on which printed information may be placed in any desired location. For analyzing the data represented by the perforations, there may be employed a mechanism like that shown in the Patent 1,916,232 issued to R. E. Paris.

The operation of a device for making minute punctures in cards may be effected in response to the sensing of perforations in a master card. In this case the master card is advanced past sensing elements in synchronism with the advancing of a blank card past puncturing devices. It is desirable that the sensing elements and the means associated therewith be adapted to detect either minute punctures or the ordinary rectangular holes in the master card. To obtain punctures in the blank card at points corresponding to those at which perforations are sensed in the master card, it is necessary that there be provided a control circuit which is operable instantly upon the sensing of a perforation to cause an operation of the puncturing device. Since the cards are moving continuously, it is necessary that the control circuit permit a rapid restoration of the puncturing device in order that it may puncture the card at the next adjacent index point if this is called for.

The principal object of this invention is to provide an improved device capable of punching holes in record cards while the latter are in motion and thus obtain a higher speed of punching than was possible hitherto.

Another object of the invention is to provide an improved puncturing device which is adapted to ride with a record card while puncturing the latter. By providing this riding motion, there is obtained a high speed of punching without a tearing of the record card.

Another object of the invention is to provide a device capable of forming minute punctures in one card in response to the sensing of holes in another card.

Still another object of the invention is to provide an improved circuit for controlling the operation of a punch magnet.

Yet another object of the invention is to provide an improved mechanism for making small pierced holes in a blank card in response to the sensing of either similar holes or the standard rectangular holes in a master card.

Other objects of the invention will be pointed out in the following description and claims and illustrated in the accompanying drawings, which disclose, by way of example, the principle of the invention and the best mode, which has been contemplated, of applying that principle.

Figure 1:
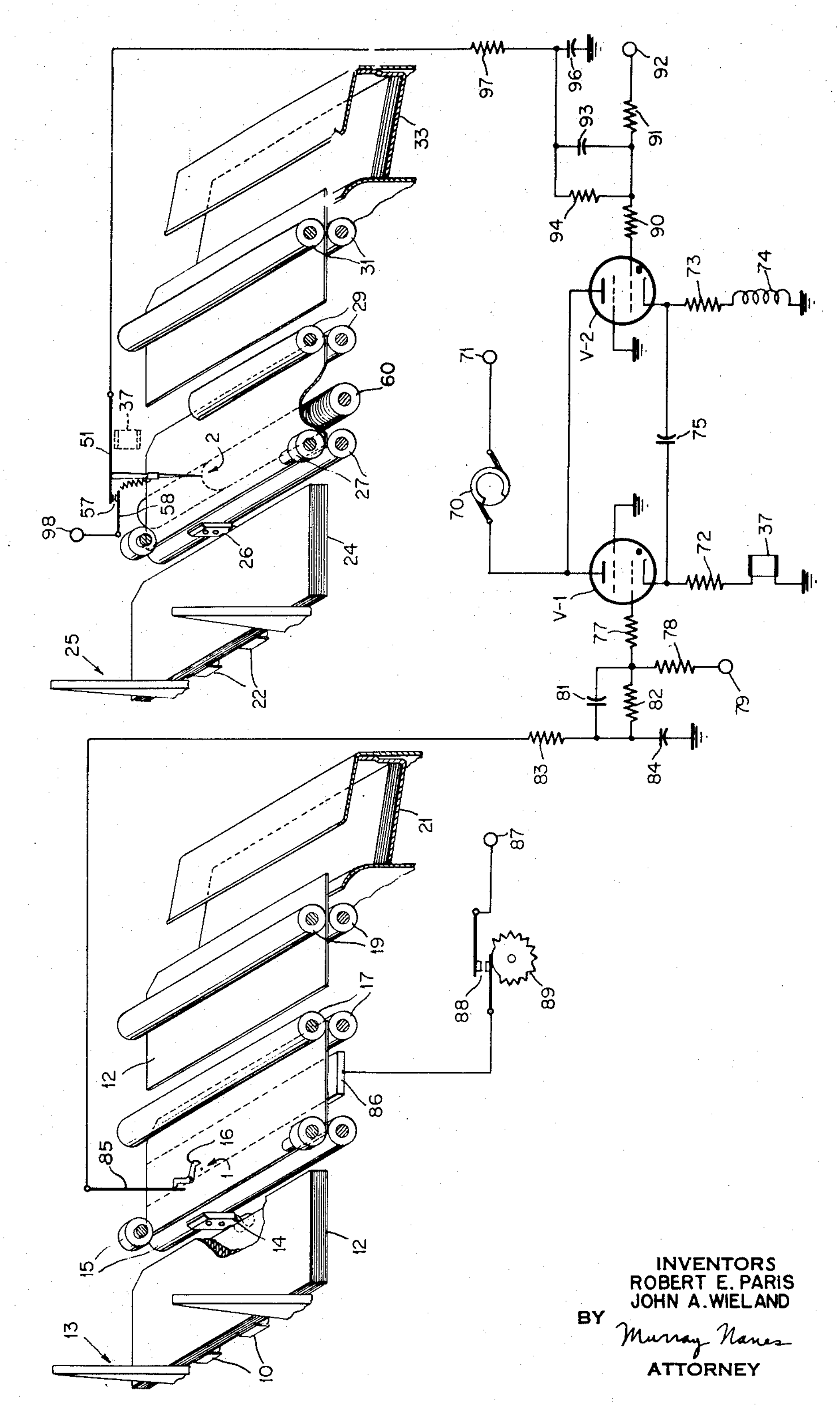
Fig. 1 is a schematic diagram showing the improved mechanism for making minute punctures in one card in response to the sensing of holes in another card.

Referring to the drawings, and more particularly to Fig. 1, it will be noted that the improved mechanism is shown arranged to operate as a reproducing punch. That is, each blank card is punctured to correspond to the perforations sensed in a separate master card. It will be appreciated that the mechanism could as well be arranged for use as a gang punch, one in which a master card is placed at the bottom of the blank cards and is fed past sensing elements in synchronism with the movement of the first blank card past the puncturing devices. The newly punctured card then moves past the sensing elements to control the puncturing of the next blank card. Arrangement of parts for the latter operation is indicated by the Laxe Patent 2,032,805. The puncturing device has been shown in the form of a needle. Operation of the mechanism as a reproducing punch and the use of a needle as a punching element are merely by way of illustration, and not essential, as the principles involved are susceptible of embodiment in many and various forms all coming within the scope of the invention.

The main purpose of the machine as shown is to sense information in a set of pattern cards at a sensing station 1 and punch that information into a set of record cards at a punching station 2. The cards are fed singly and concurrently from hoppers 13, 25 and then shifted in synchronism across the sensing and punching stations to separate stackers 21 and 33.

A reciprocating picker 10 feeds a pattern card 12 from the bottom of the hopper 13 through a throat 14 where it is engaged by a pair of feed rollers 15 and fed past a sensing device 16 at the station 1. As the card passes the sensing device, it is picked up by a pair of feed rollers 17 and advanced to a pair of feed rollers 19 which deposit it in the stacker 21.

At the hopper 25 is a reciprocating picker 22 adapted to feed a record card 24 from the bottom of a card pack through a throat 26 where it is engaged by a pair of feed rollers 27 and fed through the punching station 2. The card is then picked up by feed rollers 29 and advanced to feed rollers 31 which deposit it in the stacker 33. Any suitable means, not shown, may be provided for reciprocating the pickers 10, 22 and driving the feed rollers so as to advance the cards 12 and 24 in synchronism through the sensing station and the punching station, respectively.

An automatic reproducing punch ordinarily performs punching of holes in more than one column of the card at a time. By way of illustration, a mechanism for punching holes in only one column has been shown.

Figure 2:
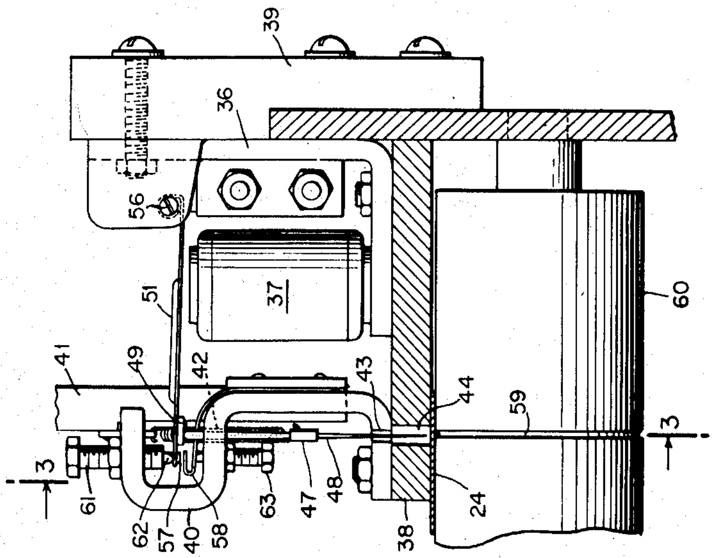
Fig. 2 is a front elevational view of the puncturing device.

Located at the punching station 2 is a punch magnet 37 having a yoke 36 (Figs. 2 and 3) which is attached to a base plate 38 and to a supporting frame 39. Mounted upon the plate 38 is an S-shaped support 40 made of an electrically conductive metal and having an opening 42 and a slot 43 overlying a slot 44 cut in the plate 38. Arranged at the lower side of the plate 38 is a roller 60 which operates to hold a record card against the plate. The edge of the plate adjacent the hopper 25 is rounded, as shown in Figs. 3 to 6, so that cards advanced by the feed rollers 27 are guided between the plate 38 and the roller 60. Extending through the opening 42 and the slot 43 into the slot 44 is a needle punch 48. A spring 46 is anchored at one end to a bracket 41 attached to the support 40 and is connected at its other end to a member 47 fixed to the needle punch. The arrangement of the spring is such that the needle punch 48 is urged upwardly against an insulating strip 49 on an armature 51 of the punch magnet 37 and is also urged laterally toward the ends of the slots 43 and 44 adjacent the feed rollers 27, as shown in Figs. 3 to 6. The armature 51 is pivoted on a shaft 56 carried by the yoke 36 and is adapted to actuate the needle punch 48 against the action of the spring 46.

When the punch magnet 37 is energized in a manner to be presently described, the armature arm 51 is rocked counterclockwise until a contact 57 on the armature strikes a metallic contact strip 58 fastened to the support 41. The insulating strip 49 acts during this time to force the needle punch 48 downwardly until its lower end passes through a card 24 and extends into a groove 59 in the roller 60. The card 24 is moving to the right in Figs. 3 to 6 and carries the end of the needle punch 48 along with it until the armature rocks upwardly on a deenergizing of the magnet 37 and permits the spring 46 to raise the needle punch 48 and return it laterally to its starting position. The engagement of the contact 57 with the contact strip 58 completes a circuit, described later, to deenergize the magnet 37. A set screw 61 with an insulated tip 62 limits the upward motion of the armature 51, and a set screw 63 varies the height of the contact strip 58 to regulate the downward motion of the armature 51.

The arrangement and operation of electronic control circuits will be described with reference to the values of applied voltage and the values of resistance and capacitance employed therein. These values are given solely for the purpose of clarifying the explanation and it is to be specifically understood that they may be varied considerably without departing from the principles of the invention.

Referring to Fig. 1, a circuit for controlling the energizing of the magnet 37 in response to the sensing of holes in the cards 12 includes two 2D21 type thyratrons V1 and V2. The plates of the thyratrons are connected together and through a commutator 70 to a +250 volt terminal 71. The commutator 70 operates in a well-known manner to apply voltage to the plates of the thyratrons only when a card is passing through the sensing station 1. The cathode of the thyratron V1 is connected through a resistor 72 of 1,600 ohms and the punch magnet 37 of 300 ohm resistance and 90 mh. inductance, to ground. The cathode of the thyratron V2 is connected through a resistor 73 of 1,100 ohm and an inductance coil 74 of 300 ohm resistance and 90 mh. inductance to ground The two cathodes are tied together through a capacitor 75 of 0.06 mf.

The control grid of V1 is connected through a 430 ohm resistor 77 to a 220 K ohm resistor 78 which is connected to a −80 volt negative bias terminal 79. One end of a wave shaping circuit, consisting of a 25 mmf. capacitor 81 connected in parallel with a 200K ohm resistor 82, is connected to a point between resistors 77 and 78. The other end of the wave shaping circuit is connected to a point between a 250 mmf. capacitor 84 and a 1 megohm resistor 83 which make up an integrating circuit. The other side of the capacitor is connected to ground and the resistor 83 is connected to a spring element 85 which acts to rock the sensing device 16 about a stationary pin into engagement with the card 12. Arranged beneath the card 12 is a flat plate 86 to which a +2000 volt terminal 87 is connected through high voltage contacts 88. Coacting with the contacts 88 is a cam 89 having 12 projections which are adapted to close the contacts as each index point on a card passes under the sensing device 16.

The control grid of V2 is connected through a 430 ohm resistor 90 and a 220K ohm resistor 91 to a −15 volt negative bias terminal 92. One end of a wave shaping circuit, consisting of a 25 mmf. capacitor 93 connected in parallel with a 220K ohm resistor 94, is connected to a point between resistors 90 and 91. The other end of the wave shaping circuit is connected to a point between a 0.02 mf. capacitor 96 and a 220K ohm resistor 97 which make up an integrating and time delay circuit. The capacitor 96 is connected to ground, as shown, and the resistor 97 is connected to the armature 51. The contact strip 58 is connected through the support 40 and a suitable conductor to a +50 volt terminal 98. The screen grids of both V1 and V2 are connected directly to ground.

Figure 6:
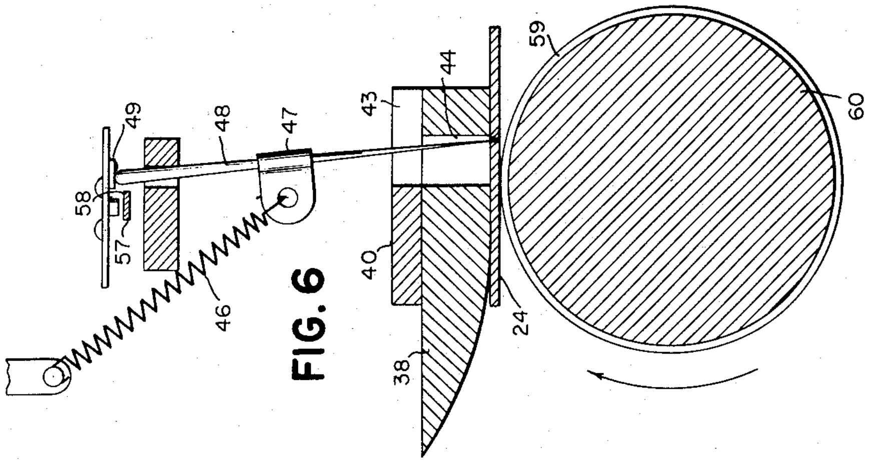
Figs. 4 to 6 are detail views showing a succession of positions taken by the puncturing device during operation.
Figure 5:
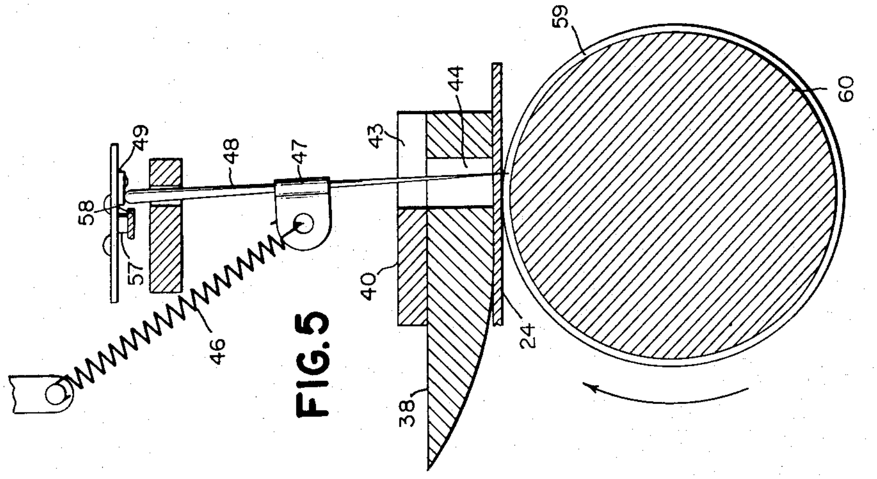
Figure 4:
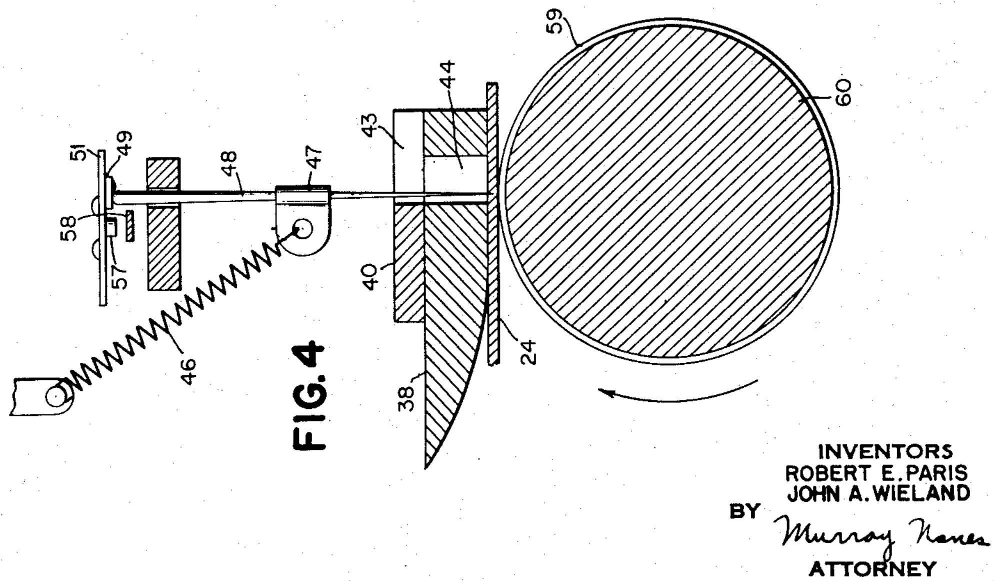

Thyratron V1 is initially held cut off by the −80 volts at terminal 79 applied to its control grid through resistors 77 and 78. When a hole in a card 12 passes under the sensing device 16, a projection on cam 89 closes contacts 88 so that the +2000 volts at terminal 87 causes a spark to pass between the sensing device 16 and the flat plate 86. When sparking takes place, an irregular positive pulse passes through the integrating circuit consisting of the resistor 83 and the capacitor 84. The wave shaping circuit consisting of the resistor 82 and the capacitor 81 acts on this positive pulse, in a well known way, to make it more square, of longer duration and give it a sharper rise time. This positive pulse is applied to the control grid of thyratron V1 through resistor 77 causing the thyratron to start conducting and effect the energizing of the punch magnet 37. The armature 51 is then operated to force the needle punch 48 through the card 24 into the groove 59 of the roller 60. As the needle enters the card, its lower end is carried by the card to the right, as shown in Figs. 4 to 6. Near the bottom of the downward stroke of the needle punch 48, the armature contact 57 strikes the contact strip 58 so that the +50 volts at terminal 98 is applied through the time delay circuit consisting of resistor 97 and capacitor 96, through the wave shaping circuit consisting of resistor 94 and capacitor 93 and through the resistor 90 to the control grid of thyratron V2 causing it to conduct.

Just previously to the start of conduction, thyratron V2 was held cut off by the −15 volts at terminal 92 being applied through resistors 91 and 90 to its control grid and there was zero voltage with respect to ground at the cathode of thyratron V2. At that time, thyratron V1 was conducting and the voltage at its cathode was equal to the +250 volts at its plate minus the drop across V1, or about +235 volts. This +235 volts difference between the cathodes is effectively applied across capacitor 75. When thyratron V2 begins to conduct, its cathode goes up to approximately +235 volts, and, since capacitor 75 cannot discharge instantaneously, the +235 volts at the cathode of V2 is added to the +235 volts across capacitor 75 to put a voltage of +470 volts on the cathode of thyratron V1. This makes the plate of thyratron V1 negative with respect to the cathode and effectively cuts V1 off, deenergizing the punch magnet 37.

Figure 3:
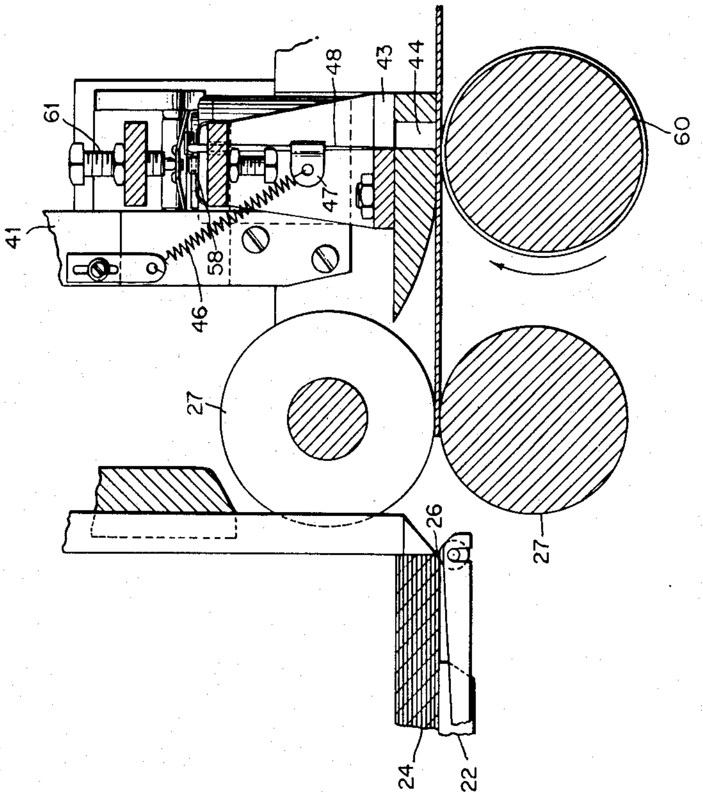
Fig. 3 is a vertical section taken on the line 3—3 in Fig. 2.

The different positions taken by the needle punch 48 and the contacts 57 and 58 are shown in Figs. 3, 4, 5 and 6. Fig. 3 shows needle punch 48 held against the left hand ends of the slots 43, 44 and in its normally raised position. In Fig. 4, armature arm 51 is beginning its downward descent, the needle punch 48 is just entering the card 24, and contacts 57 and 58 are beginning to close. In Fig. 5 the contacts 57 and 58 are closed, and the end of the freely pivoted needle punch has been carried along by the card 24. At this point, thyratron V2 cuts off thyratron VI and the punch magnet 37 is deenergized. In Fig. 6, the spring 46 has begun to return the needle punch to its original position preparatory for the next punching operation and the contacts 57 and 58 are open.

It will be understood that the cards 12 may be perforated with either the standard rectangular holes or with minute punctures. When rectangular holes are sensed, the sensing device 16 rides in each hole for a period longer than the time needed for energizing and deenergizing the punch magnet 37. If the contacts 88 and the cam 89 were not provided, a voltage high enough to keep tube VI fired would be constantly applied to the grid of VI. This would make it impossible to cut off the tube VI and would result in the needle punch 48 tearing the records. The cam 89 is continuously driven and synchronized with the card feed and has twelve short projections which correspond to the index point positions on the card. The projections on the cam 89, therefore, are constructed to hold the contacts 88 closed only long enough to allow for the firing of tube VI. The control circuit can then go through a full punching operation and nothing will prevent thyratron VI from being cut off.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A mechanism for perforating a record comprising, in combination, an element adapted to be actuated for perforating said record, a magnet operative when energized for actuating said element, means for controlling the energizing of said magnet comprising, in combination, first and second gaseous tubes, each having grid, anode and cathode electrodes, and each said tube capable of a conductive and non-conductive state, circuit connections for rendering one gaseous tube non-conductive whenever the other said gaseous tube is rendered conductive, means coupling said anodes, means connected to supply direct current anode potential to said tubes, means for applying a potential to the grid of said first gaseous tube for maintaining said first gaseous tube normally non-conductive, means for applying a potential to said grid of said second gaseous tube for maintaining said second tube normally conductive, conductors connecting the cathode of said first gaseous tube through said magnet to ground, said magnet being energized when said first tube conducts, an impedance, conductors connecting the cathode of said second gaseous tube through said impedance to ground, a pulsing means for initiating conduction in said first tube, normally open contacts adapted to be closed by said electromagnet when energized, and circuit means including said contacts and operative to initiate conduction of said second tube when said contacts are closed.

2. A mechanism for perforating a record comprising, in combination, an elongated element movable longitudinally into engagement with said record for piercing the latter, means loosely guiding said element for both longitudinal and pivotal movement, said record operating to impart pivotal movement to said element when engaged by the latter, said guiding means engageable by said element for limiting pivotal movement in one direction to a position normal to said record, a magnet having an armature acting upon one end of said element and operable to move the latter into engagement with said record when the magnet is energized, a spring connected to said element for urging it toward said normal position and into engagement with said armature, means for controlling the energizing of said magnet, said last mentioned means including a first gaseous tube, means for connecting said magnet in the cathode circuit of said first tube, a second gaseous tube, an impedance connected in the cathode circuit of said second tube, a capacitor connected in a circuit extending between the cathodes of said first and second tubes, means for subjecting the plates of said first and second tubes to a constant positive voltage, a pair of contacts adapted to be closed upon actuation of said element, means for subjecting one of said contacts to a firing voltage, means for connecting the other of said contacts to the grid of said second tube, and means for applying a firing voltage to the grid of said first tube.

References Cited in the file of this patent

UNITED STATES PATENTS

| | | |
|---|---|---|
| 395,427 | Delany | Jan. 1, 1889 |
| 581,496 | Sturtevant | Apr. 27, 1897 |
| 652,754 | Davis | July 3, 1900 |
| 938,286 | Suren | Oct. 26, 1909 |
| 2,162,508 | Knowles | June 13, 1939 |
| 2,224,832 | Pfister | Dec. 10, 1940 |
| 2,299,272 | Hallden | Oct. 20, 1942 |
| 2,372,106 | Nagel | Mar. 20, 1945 |